No. 721,268. PATENTED FEB. 24, 1903.
A. WOLFF.
CARBURETER.
APPLICATION FILED JULY 7, 1902.
NO MODEL.
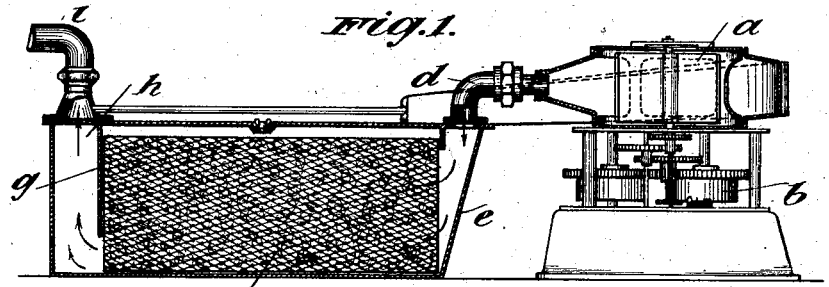
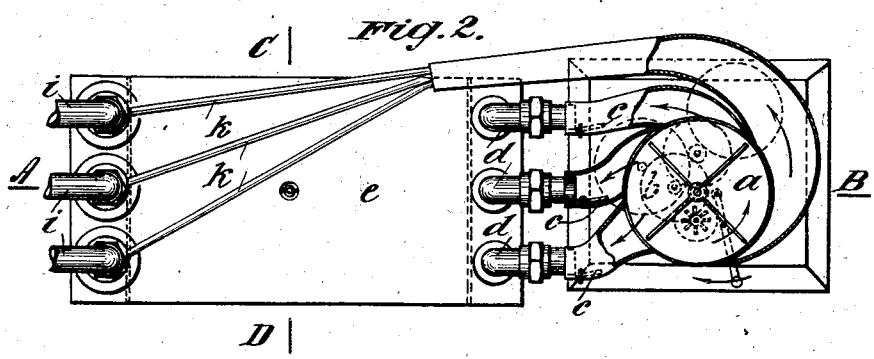
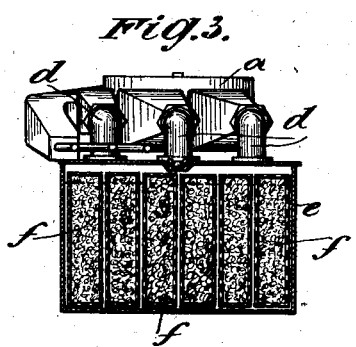
Witnesses:
Inventor:
Adolph Wolff.
By
Attys

UNITED STATES PATENT OFFICE.

ADOLPH WOLFF, OF ZURICH, SWITZERLAND.

CARBURETER.

SPECIFICATION forming part of Letters Patent No. 721,268, dated February 24, 1903.

Application filed July 7, 1902. Serial No. 114,580. (No model.)

*To all whom it may concern:*

Be it known that I, ADOLPH WOLFF, a subject of the King of Prussia, Emperor of Germany, residing at Zurich, Switzerland, have invented new and useful Improvements in or Relating to Gas-Generators or Carbureters, of which the following is a specification.

The present invention relates to a gas-generator or carbureter, particularly adapted for use in connection with cooking, heating, and lighting purposes, in which the formation of gas takes place by passing air driven by a fan or blower over, through, or in contact with porous material impregnated with liquid hydrocarbon, the blower being driven by clockwork, thus enabling the apparatus to be transported and set up at will.

In the accompanying drawings a constructional form of the invention is shown by way of example.

Figure 1 is a vertical section of the apparatus on the line A B of Fig. 2, the latter being a plan view, partly in horizontal section, while Fig. 3 is a cross-section on the line C D of Fig. 2.

A blower or fan $a$ in a suitable casing is driven by clockwork mechanism $b$, the casing being connected by a conduit pipe or pipes $d$ with a vessel $e$, in which plates $f$, of fibrous peat or other absorbent material, inclosed in a netting—for example, of wire—are arranged side by side in such a manner that spaces for the passage of air are provided between them. The plates are impregnated with liquid hydrocarbon. Preferably at the end of the vessel opposite to the air-inlet end are gas-delivery tubes $i$, while conduit-pipes $k$ connect the latter directly with the blower. A gas-collecting chamber $h$ is arranged in the vessel $e$ adjacent to the delivery-tubes, being formed by the outer wall of the vessel $e$, and a depending partition $g$, not reaching the bottom of the vessel, is so formed as to allow of the passage of the impregnated air from the vessel to the exit-tubes. Closing disks or dampers are preferably inserted in the conduit-pipes $d$. The air forced by the blower into the vessel $e$ passes between the absorbent material, becomes saturated with hydrocarbon, and escapes at $i$ from the vessel as fuel-gas. If the fuel-gas escaping from the vessel is too saturated, fresh air can be conveyed to it through the air-conduit pipes $k$, suitable regulating means being provided.

By means of the present invention by the arrangement of a clockwork mechanism as driving means for the ventilator a gas-generator or carbureter of compact form is provided which is capable of being transported and set up at will.

Having now particularly described and ascertained the nature of my said invention and in what manner the same is to be performed, I declare that what I claim is—

1. The combination with a carbureter, independent removable carbureting elements therein and suitable outlet-pipes; of a blower comprising a casing, a driven fan therein and independent branches leading from the casing to the carbureter, substantially as described.

2. The combination with a carbureter, and independent removable carbureting elements therein, each composed of peat fiber inclosed in a metallic foraminiferous sheath and suitable outlet-pipes; of a blower-casing, a driven fan therein, independent branches leading from the casing to the carbureter and means to supply air directly to the outlet-pipes from said casing, substantially as described.

3. The combination with a carbureter, independent removable carbureting elements therein, and delivery-pipes; of a blower-casing, a driven fan therein, independent valve-controlled branches from the casing to the carbureter, and a branch directly connected to the delivery-pipes, substantially as described.

In testimony whereof I have signed my name to this specification in the presence of two subscribing witnesses.

ADOLPH WOLFF.

Witnesses:
 MORITZ VEITH,
 A. LIEBERKNECHT.